(12) United States Patent
Lin et al.

(10) Patent No.: US 11,106,574 B2
(45) Date of Patent: Aug. 31, 2021

(54) MEMORY ALLOCATION METHOD, APPARATUS, ELECTRONIC DEVICE, AND COMPUTER STORAGE MEDIUM

(71) Applicant: ONEPLUS TECHNOLOGY (SHENZHEN) CO., LTD., Shenzhen (CN)

(72) Inventors: Kengyu Lin, Shenzhen (CN); Wenyen Chang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/623,051

(22) PCT Filed: Jun. 11, 2018

(86) PCT No.: PCT/CN2018/090620
§ 371 (c)(1),
(2) Date: Dec. 16, 2019

(87) PCT Pub. No.: WO2018/228327
PCT Pub. Date: Dec. 20, 2018

(65) Prior Publication Data
US 2020/0167272 A1 May 28, 2020

(30) Foreign Application Priority Data
Jun. 16, 2017 (CN) .......................... 201710457637.7

(51) Int. Cl.
*G06F 12/02* (2006.01)

(52) U.S. Cl.
CPC .... *G06F 12/023* (2013.01); *G06F 2212/1044* (2013.01)

(58) Field of Classification Search
None
See application file for complete search history.

(56) References Cited

U.S. PATENT DOCUMENTS 7,068,545 B1 * 6/2006 Kimelman .......... G06F 12/1441
365/189.16
8,854,680 B2 10/2014 Bellert
(Continued)

FOREIGN PATENT DOCUMENTS

| CN | 101122883 A | 2/2008 |
| CN | 101702138 A | 5/2010 |

(Continued)

OTHER PUBLICATIONS

International Search Report in the international application No. PCT/CN2018/090620, dated Aug. 28, 2018.
(Continued)

*Primary Examiner* — Charles Rones
*Assistant Examiner* — Ryan Dare
(74) *Attorney, Agent, or Firm* — Syncoda LLC; Feng Ma (57) ABSTRACT

A memory of an electronic device includes a first memory region and a second memory region. A memory allocation method includes: receiving a request for memory allocation, the request for memory allocation including a memory capacity to be allocated; comparing the memory capacity to be allocated and a capacity range of a preset memory block to obtain a comparison result; according to the comparison result, allocating a memory block with the memory capacity from at least one of the first memory region or the second memory region.

17 Claims, 7 Drawing Sheets

(56) References Cited

U.S. PATENT DOCUMENTS

| | | |
|---|---|---|
| 2001/0018731 A1 | 8/2001 | Fujii |
| 2005/0172096 A1 | 8/2005 | Van Heesch |
| 2005/0216691 A1* | 9/2005 | Michael ................ G06F 9/5016 |
| | | 711/170 |
| 2005/0268049 A1 | 12/2005 | De Lange |
| 2006/0085433 A1* | 4/2006 | Bacon ................ G06F 12/0253 |
| 2007/0156998 A1 | 7/2007 | Gorobets |
| 2008/0133870 A1 | 6/2008 | Holt |
| 2008/0133871 A1 | 6/2008 | Holt |
| 2010/0060934 A1 | 3/2010 | Bellert |
| 2010/0146197 A1 | 6/2010 | Gorobets |
| 2010/0161929 A1 | 6/2010 | Nation |
| 2012/0124320 A1 | 5/2012 | Kato |
| 2012/0191900 A1* | 7/2012 | Kunimatsu ........... G06F 3/0653 |
| | | 711/103 |
| 2013/0205111 A1* | 8/2013 | Sakai .................... G06F 3/0608 |
| | | 711/170 |

FOREIGN PATENT DOCUMENTS

| | | |
|---|---|---|
| CN | 101923511 A | 12/2010 |
| CN | 102819497 A | 12/2012 |
| CN | 103793332 A | 5/2014 |
| CN | 107203477 A | 9/2017 |

OTHER PUBLICATIONS

English translation of the Written Opinion of the International Search Authority in the international application No. PCT/CN2018/090620, dated Aug. 28, 2018.

Supplementary European Search Report in the European application No. 18818963.3, dated Feb. 11, 2021.

* cited by examiner

MEMORY ALLOCATION METHOD, APPARATUS, ELECTRONIC DEVICE, AND COMPUTER STORAGE MEDIUM

CROSS-REFERENCE TO RELATED APPLICATIONS

The application is a national stage of International Application No. PCT/CN2018/090620 filed on Jun. 11, 2018, which claims priority to Chinese Patent Application No. 201710457637.7, filed on Jun. 16, 2017. The disclosures of these applications are hereby incorporated by reference in their entirety.

TECHNICAL FIELD

The disclosure relates to computer storage technologies, and more particularly, to a method and device for memory allocation, an electronic device and a readable storage medium.

BACKGROUND

In the related arts, an electronic device directly selects, when receiving a request for memory allocation, a suitable region from available memory blocks of an entire memory without distinguishing a size of a required memory capacity. As a result, memory blocks with small-capacity are constantly distributed in the entire memory. After a system is run for a period of time, allocation and release of memory blocks are continuously performed in the system, an idle physical memory of the system is partitioned by the used memory blocks, there is no large continuous physical memory block, and idle memory blocks may only meet a requirement for a small-capacity memory allocation. That is, the system may still have many idle memory blocks but cannot meet a requirement for a large-capacity memory allocation, in such case, memory fragmentation occurs.

In case of memory fragmentation, certain time is required to perform memory compaction to obtain a whole continuous storage space. By this method, a memory block with large-capacity is obtained, but influence may be brought to normal operations of a user to a certain extent or additional power consumption and the like may be caused.

SUMMARY

Embodiments of the disclosure provide a method and device for memory allocation, an electronic device and a readable storage medium, which may solve a problem of fragmentation.

The embodiments of the disclosure provide a method for memory allocation, which may be applied to an electronic device, a memory of the electronic device includes a first memory region and a second memory region, and the method includes the following operations.

A request for memory allocation is received, here, the request for memory allocation includes a memory capacity to be allocated.

The memory capacity to be allocated is compared with a capacity range of a preset memory block to obtain a comparison result.

A memory block with the memory capacity to be allocated is allocated from the first memory region or the second memory region according to the comparison result.

The embodiments of the disclosure provide a device for memory allocation, which may be for use in an electronic device, a memory of the electronic device includes a first memory region and a second memory region, and the device includes a receiving module, a comparison module and an allocation module.

The receiving module may be configured to receive a request for memory allocation, here, the request for memory allocation includes a memory capacity to be allocated.

The comparison module may be configured to compare the memory capacity to be allocated and a capacity range of a preset memory block to obtain a comparison result.

The allocation module may be configured to allocate a memory block with the memory capacity from the first memory region or the second memory region according to the comparison result.

The embodiments of the disclosure provide an electronic device, a memory of the electronic device includes a first memory region and a second memory region, and the electronic device includes the memory, a processor and a device for memory allocation.

Here, the device for memory allocation is installed in the memory and includes one or more software function modules executed by the processor, and the device includes a receiving module, a comparison module and an allocation module.

The receiving module may be configured to receive a request for memory allocation, here, the request for memory allocation includes a memory capacity to be allocated.

The comparison module may be configured to compare the memory capacity to be allocated and a capacity range of a preset memory block to obtain a comparison result.

The allocation module may be configured to allocate a memory block with the memory capacity from the first memory region or the second memory region according to the comparison result.

The embodiments of the disclosure also provide a readable storage medium, which may include a computer program that, when executed, controls an electronic device where the readable storage medium is located to perform the method for memory allocation provided in the embodiments of the disclosure.

The embodiments of the disclosure may have the following beneficial effects.

According to the embodiments of the disclosure, not only a response is made to a request for memory allocation, but also memory blocks in different sizes are separately managed, so as to reduce a probability of fragmentation caused by mixed use of the memory blocks in different sizes.

BRIEF DESCRIPTION OF THE DRAWINGS

In order to describe the technical solutions of the embodiments of the disclosure more clearly, the drawings required to be used in the embodiments will be simply introduced below. It is to be understood that the following drawings only illustrate some embodiments of the disclosure and thus should not be considered as limits to the scope. Other related drawings may further be obtained by those of ordinary skill in the art according to these drawings without creative work.

Reference signs: 100—electronic device; 110—memory; 120—storage controller; 130—processor; 200—device for memory allocation; 210—configuration module; 220—receiving module; 230—comparison module; 240—allocation module; 250—capacity adjustment module; 251—detection sub-module; and 252—adjustment sub-module.

DETAILED DESCRIPTION

The technical solutions in the embodiments of the disclosure will be clearly and completely described below in combination with the drawings in the embodiments of the disclosure. It is apparent that the described embodiments are not all embodiments but only part of embodiments of the disclosure. Components, described and illustrated in the drawings, of the embodiments of the disclosure may usually be arranged and designed with various configurations. Therefore, the following detailed descriptions about the embodiments of the disclosure in the drawings are not intended to limit the scope of the disclosure but only represent selected embodiments of the disclosure. All other embodiments obtained by those skilled in the art based on the embodiments of the disclosure without creative work shall fall within the scope of protection of the disclosure.

It is to be noted that similar reference signs and letters represent similar terms in the following drawings and thus a certain term, once being defined in a drawing, is not required to be further defined and explained in subsequent drawings. In addition, terms "first", "second" and the like in the descriptions of the disclosure are only adopted for distinguishing and may not be understood to indicate or imply relative importance.

Some implementation modes of the disclosure will be described below in combination with the drawings in detail. The following embodiments and characteristics in the embodiments may be combined without conflicts.

Figure 1:
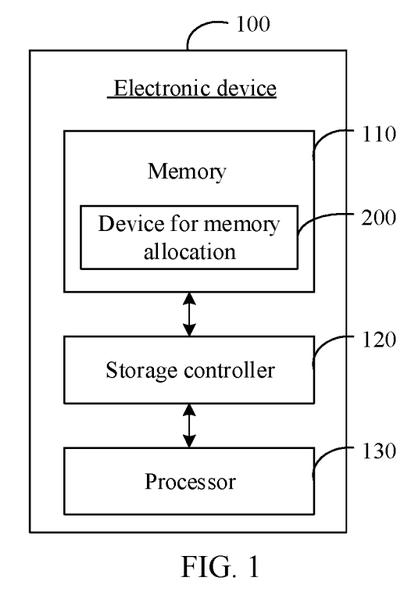
FIG. 1 is a structure diagram of an electronic device according to embodiments of the disclosure.

Referring to FIG. 1, FIG. 1 is a structure diagram of an electronic device 100 according to embodiments of the disclosure. The electronic device 100 in the embodiments of the disclosure may be, but not limited to, a smart phone, a tablet computer and the like. The electronic device 100 includes a memory 110, a storage controller 120, a processor 130 and a device 200 for memory allocation.

The memory 110, the storage controller 120 and the processor 130 are electrically connected with one another directly or indirectly to implement data transmission or interaction. For example, these components may be electrically connected through one or more communication buses or signal lines. The device 200 for memory allocation is stored in the memory 110. The device 200 for memory allocation includes at least one software function module stored in the memory 110 in form of software or firmware. The processor 130 runs a software program or module, for example, the device 200 for memory allocation in the embodiments of the disclosure, stored in the memory 110, thereby executing various function applications and data processing, namely implementing the method for memory allocation in the embodiments of the disclosure.

The memory 110 may be, but not limited to, a Random Access Memory (RAM), a Read Only Memory (ROM), a Programmable Read-Only Memory (PROM), an Erasable Programmable Read-Only Memory (EPROM), an Electrically Erasable Programmable Read-Only Memory (EEPROM) and the like. The memory 110 is configured to store a program, and the processor 130 executes, after receiving an execution instruction, the program. The processor 130 and another possible component may access the memory 110 under control of the storage controller 120.

In some embodiments, in addition to the memories of the abovementioned types, the memory 110 may further include a memory called an internal memory, configured to temporarily store arithmetic data of the processor 130 during power-on and further configured to store data acquired from a network, data exchanged by an external device such as a hard disk and the like.

The processor 130 may be an integrated circuit chip with a signal processing capability. The processor 130 may be a universal processor, including a Central Processing Unit (CPU), a Network Processor (NP) and the like. The processor 130 may also be a Digital Signal Processor (DSP), an Application Specific Integrated Circuit (ASIC), a Field-Programmable Gate Array (FPGA) or another programmable logical device, discrete gate or transistor logical device and discrete hardware component. Each method, operation and logical block diagram disclosed in the embodiments of the disclosure may be implemented or executed. The universal processor may be a microprocessor or the processor may be any conventional processor and the like.

It may be understood that the structure illustrated in FIG. 1 is only schematic and the electronic device 100 may further include components more or fewer than those illustrated in FIG. 1 or adopt a configuration different from that illustrated in FIG. 1. Each component illustrated in FIG. 1 may be implemented by use of hardware, software or a combination thereof.

Figure 2:
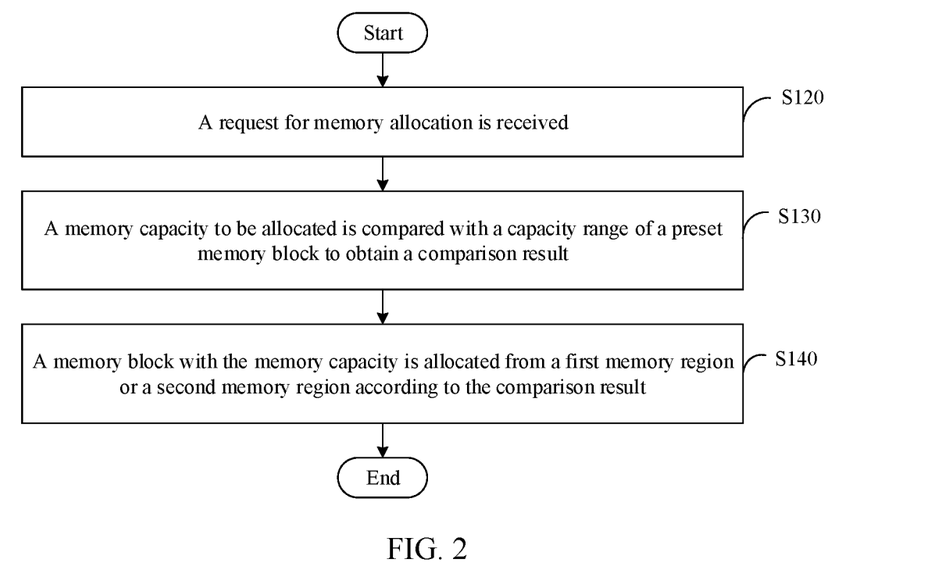
FIG. 2 is a first flowchart of a method for memory allocation according to embodiments of the disclosure.

Referring to FIG. 2, FIG. 2 is a first flowchart of a method for memory allocation according to embodiments of the disclosure. The method is applied to an electronic device 100. A memory of the electronic device 100 includes a first memory region and a second memory region. A specific flow of the method for memory allocation will be described below in detail.

In S120, a request for memory allocation is received.

In the embodiments of the disclosure, many programs are run in the electronic device 100. When a program is run (for example, a webpage is browsed through a browser), a request for memory allocation may usually be sent to a system to obtain a memory with a corresponding capacity as required. The request for memory allocation includes a memory capacity to be allocated.

In S130, the memory capacity to be allocated is compared with a capacity range of a preset memory block to obtain a comparison result.

In the embodiments of the disclosure, the system of the electronic device 100 determines, after receiving the request for memory allocation, whether the memory capacity to be allocated is within the capacity range of the preset memory block, thereby allocating a memory block with the corresponding capacity (i.e., the memory capacity to be allocated). Meanwhile, memory blocks in different sizes may be distinguished, and the memory blocks in different sizes may be separately managed. The capacity range of the preset memory block may be set according to a practical condition (for example, different systems).

In some embodiments of the disclosure, a capacity of a preset memory block may minimally be 4 KB, which is represented as 4 KB*2^0, and then may be 8 KB (4 KB*2^1), 16 KB (4 KB*2^2), . . . , 1 MB (4 KB*2^8), 2 MB (4 KB*2^9) and 4 MB (4 KB*2^10). The value corresponding to a power in the power of 2 is called order, and thus the minimum 4 KB is order 0, and the maximum 4 MB is order 10. In some other embodiments of the disclosure, the capacity range of the preset memory block is set to be order 0 to order 10 (4 KB to 4 MB). Due to different systems, the capacity range of the preset memory block may also be set to be another range, for example, order 3 to order 10 (32 KB to 4 MB).

In S140, a memory block with the memory capacity to be allocated is allocated from the first memory region or the second memory region according to the comparison result.

In the embodiments of the disclosure, the memory block with the memory capacity to be allocated is allocated from the first memory region or the second memory region according to the comparison result, so as to achieve the purpose of separately managing the memory blocks in different sizes and further reduce a probability of fragmentation caused by mixed use of the memory blocks in different sizes. Memory fragmentation refers to that when a user requires a continuous memory block with a set capacity (recorded as N), a capacity of each memory block is less than N required by the user although a total available capacity of the memory is greater than N, which results in that it impossible to meet the requirement of the user.

In the embodiments of the disclosure, if the memory capacity to be allocated is within the capacity range of the preset memory block and an available memory capacity of the first memory region is greater than the memory capacity to be allocated, a preset memory block with the memory capacity to be allocated is allocated from the first memory region. The memory capacity to be allocated is within the capacity range of the preset memory block, which represents that the memory block corresponding to the request for memory allocation may be a memory block with a small capacity. When an available memory in the first memory region is enough to meet the request for memory allocation (i.e., memory allocation requirement), a preset memory block with the small capacity is allocated from the first memory region. Therefore, a purpose of separately managing the memory blocks in different sizes is achieved.

In the embodiments of the disclosure, if the memory capacity to be allocated is within the capacity range of the preset memory block and the available memory capacity of the first memory region is less than the memory capacity to be allocated (for example, the available memory capacity of the first memory region is 0), the preset memory block with the memory capacity to be allocated is allocated from the second memory region. The memory capacity to be allocated is within the capacity range of the preset memory block, which represents that the memory block corresponding to the request for memory allocation may be a memory block with a small capacity, but the available memory in the first memory region is not enough to meet the request for memory allocation, so the preset memory block with the small capacity is allocated from the second memory region to meet the request for memory allocation.

In the embodiments of the disclosure, if the memory capacity to be allocated is not within the capacity range of the preset memory block, the memory block with the memory capacity to be allocated is allocated from at least one of the first memory region or the second memory region. The memory capacity to be allocated is not within the preset memory block capacity range, which represents that the memory block corresponding to the request for memory allocation may be a memory block with a large capacity. The memory block with the large capacity is allocated from the first memory region or the second memory region to achieve the purpose of separately managing the memory blocks in different sizes.

For example, under such a condition, if an available memory capacity of the second memory region is greater than the memory capacity to be allocated, the memory block with the memory capacity to be allocated is allocated from the second memory region. When the memory capacity to be allocated is not within the capacity range of the preset memory block, responsive to detecting that the available memory capacity of the second memory region is greater than the memory capacity to be allocated, the memory block with the memory capacity to be allocated may be allocated from the second memory region to enable the second memory region to manage a memory block with the large capacity. The available memory capacity of the second memory region may be a continuous and allocable memory space in the second memory region.

If the available memory capacity of the second memory region is less than the memory capacity to be allocated, memory compaction is performed to obtain, from the at least one of the first memory region or the second memory region, the memory block capable of meeting the memory capacity to be allocated. Memory compaction is to make available memories adjacent for integration into a whole continuous memory space.

In an operating system, a virtual address and a practical memory are required to be mapped for conversion. For example, mapping may include the following two conditions. One is movable mapping, namely mapping between a virtual address and a practical memory address may be dynamically adjusted (for example, memories used by the user have the same virtual address but may be dynamically mapped to different practical memory addresses). The other is unmovable mapping, namely mapping between a virtual address and a practical memory address is not allowed to change (for example, a virtual address for a drive program or the operating system and a physical memory address for the drive program or the operating system). Memory compaction is to dynamically adjust a whole movable mapping region to provide a large enough and continuous physical memory space that is required.

Figure 3:
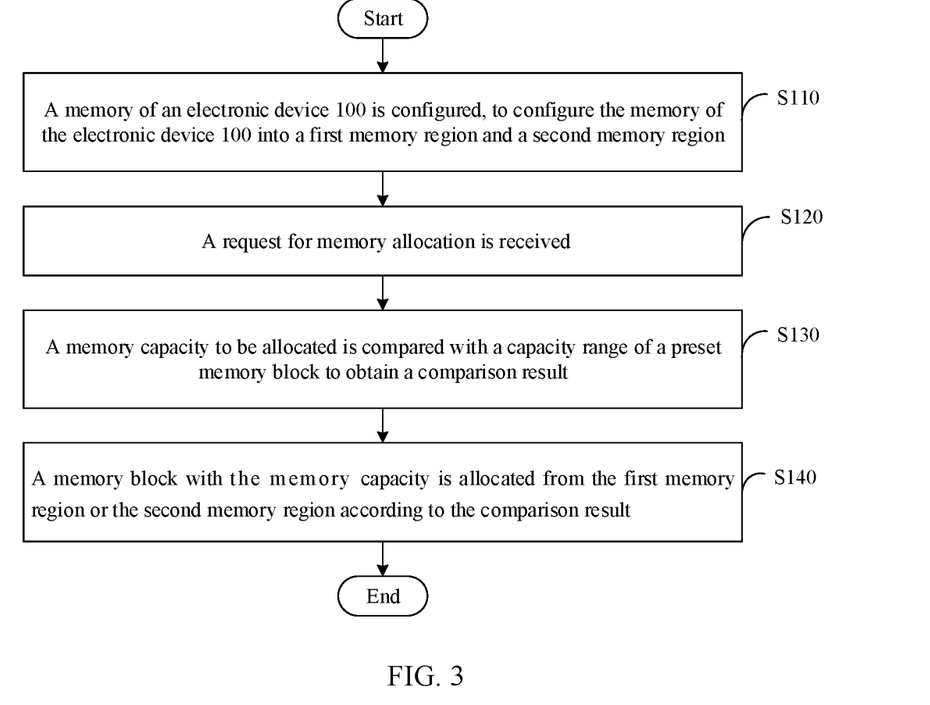
FIG. 3 is a second flowchart of a method for memory allocation according to embodiments of the disclosure.

Referring to FIG. 3, FIG. 3 is a second flowchart of a method for memory allocation according to embodiments of the disclosure. The method may further include S110.

In S110, the memory of the electronic device 100 is configured, to configure the memory of the electronic device 100 into the first memory region and the second memory region.

In the embodiments of the disclosure, after the electronic device 100 is initialized, a part of the memory of the electronic device 100 is reserved as the first memory region, and the remaining memory space of the memory is determined as the second memory region. A size of the first memory region may be set according to a practical condition (for example, the first memory region is set to be 100 MB or 0).

Figure 4:
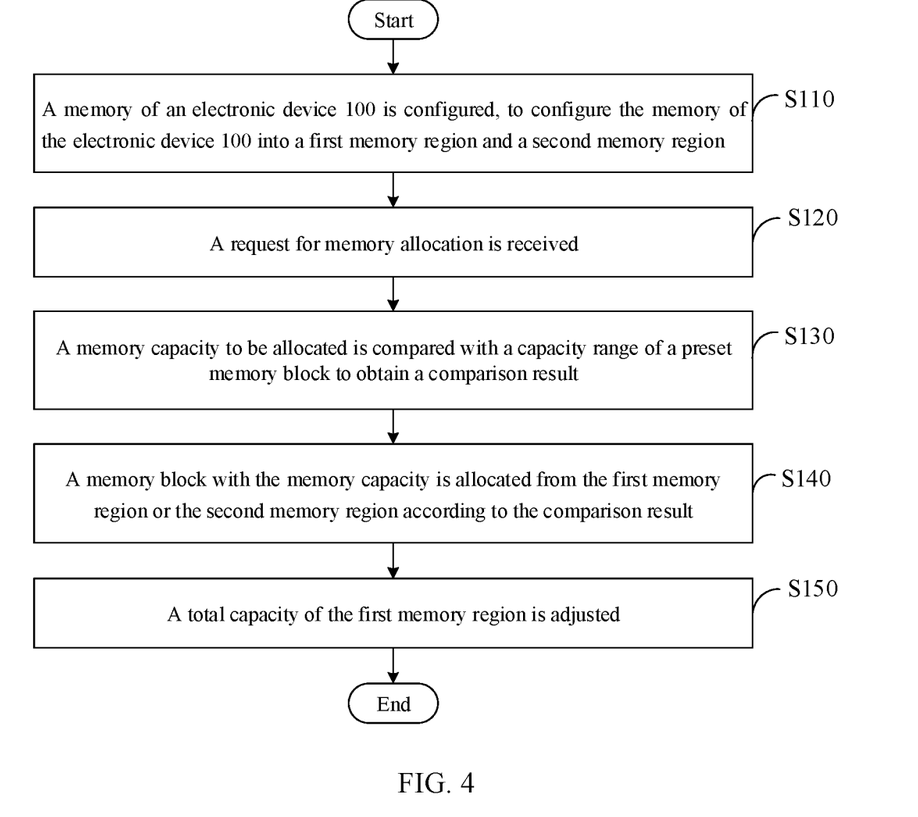
FIG. 4 is a third flowchart of a method for memory allocation according to embodiments of the disclosure.

Referring to FIG. 4, FIG. 4 is a third flowchart of a method for memory allocation according to embodiments of the disclosure. The method may further include S150.

In S150, a total capacity of the first memory region is adjusted.

In the embodiments of the disclosure, after the memory is configured to obtain the first memory region, the total capacity of the first memory region may be adjusted according to the practical condition (for example, a memory usage of the first memory region), so that exhaustion of the memory capacity of the first memory region may be prevented. When the available capacity of the first memory region is large, the total capacity of the first memory region may also be reduced to avoid waste.

Figure 5:
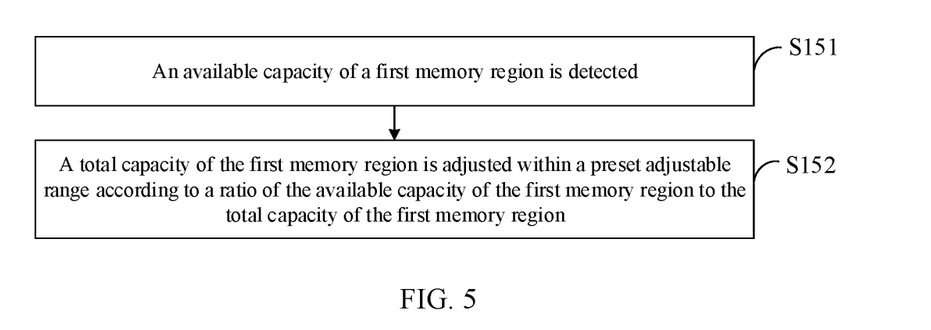
FIG. 5 is a flowchart of sub-operations of S150 in FIG. 4 according to embodiments of the disclosure.

Referring to FIG. 5, FIG. 5 is a flowchart of sub-operations of S150 in FIG. 4 according to embodiments of the disclosure. S150 may include S151 and S152.

In S151, an available capacity of the first memory region is detected.

In some embodiments of the disclosure, the first memory region may be detected to obtain the memory usage of the first memory region, for example, a used capacity and the available capacity.

In S152, the total capacity of the first memory region is adjusted within a preset adjustable range according to a ratio of the available capacity of the first memory region to the total capacity of the first memory region.

In some embodiments of the disclosure, the available capacity of the first memory region is compared with the total capacity of the first memory region to obtain the ratio of the available capacity of the first memory region to the total capacity of the first memory region. The total capacity of the first memory region is adjusted within the preset adjustable range according to the ratio obtained. The preset adjustable range may be set according to a practical condition (for example, the preset adjustable range is 0 to a total capacity of the memory of the electronic device 100, e.g., 0 to 1 GB).

When the ratio is less than a first preset value, the total capacity of the first memory region is increased. When the ratio is greater than a second preset value, the total capacity of the first memory region is reduced. The second preset value is greater than the first preset value. The adjusted total capacity of the first memory region is still within the preset adjustable range.

A manner for increasing or reducing may include that the system of the electronic device 100 automatically increases or reduce by a set memory capacity (for example, 10 MB) according to the ratio, or may include that an input operation is received and the total capacity of the first memory region is increased or reduced by a corresponding memory space according to a setting of the operation.

How to adjust the total capacity of the first memory region will be introduced below with an example.

The total capacity of the first memory region is preset to be 100 MB. When the used capacity of the first memory region is 95 MB and the available capacity is 5 MB, the total capacity of the first memory region is automatically increased by 10 MB, and the total capacity of the first memory region is increased to be 110 MB. When the used capacity of the first memory region is 30 MB and the available capacity is 70 MB, the total capacity of the first memory region is automatically decreased by 10 MB, and the total capacity of the first memory region is decreased to be 90 MB. In such a manner, the condition that the memory space of the first memory region is exhausted or an idle memory space of the first memory region is too large is avoided.

Figure 6:
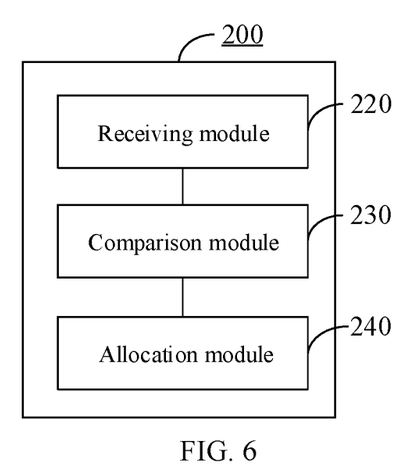
FIG. 6 is a first structure diagram of a device for memory allocation according to embodiments of the disclosure.

Referring to FIG. 6, FIG. 6 is a first structure diagram of a device 200 for memory allocation according to embodiments of the disclosure. The device 200 for memory allocation is applied to an electronic device 100. A memory of the electronic device 100 includes a first memory region and a second memory region. The device 200 for memory allocation includes a receiving module 220, a comparison module 230 and an allocation module 240.

The receiving module 220 is configured to receive a request for memory allocation, here, the request for memory allocation includes a memory capacity to be allocated.

In the embodiments of the disclosure, the receiving module 220 is configured to execute S120 in FIG. 2, and specific descriptions about the receiving module 220 may refer to the descriptions about S120 in FIG. 2.

The comparison module 230 is configured to compare the memory capacity to be allocated and a capacity range of a preset memory block to obtain a comparison result.

In the embodiments of the disclosure, the comparison module 230 is configured to execute S130 in FIG. 2, and specific descriptions about the comparison module 230 may refer to the descriptions about S130 in FIG. 2.

The allocation module 240 is configured to allocate a memory block with the memory capacity from the first memory region or the second memory region according to the comparison result.

The allocation module 240 is configured to allocate the memory block with the memory capacity from the first memory region or the second memory region according to the comparison result, which includes the following operations.

If the memory capacity to be allocated is within the capacity range of the preset memory block and an available memory capacity of the first memory region is greater than the memory capacity to be allocated, a preset memory block with the memory capacity is allocated from the first memory region.

If the memory capacity to be allocated is within the capacity range of the preset memory block and the available memory capacity of the first memory region is less than the memory capacity to be allocated, the preset memory block with the memory capacity is allocated from the second memory region.

If the memory capacity to be allocated is not within the capacity range of the preset memory block, the memory block with the memory capacity is allocated from the first memory region or the second memory region.

In the embodiments of the disclosure, the allocation module 240 is configured to execute S140 in FIG. 2, and specific descriptions about the allocation module 240 may refer to the descriptions about S140 in FIG. 2.

Figure 7:
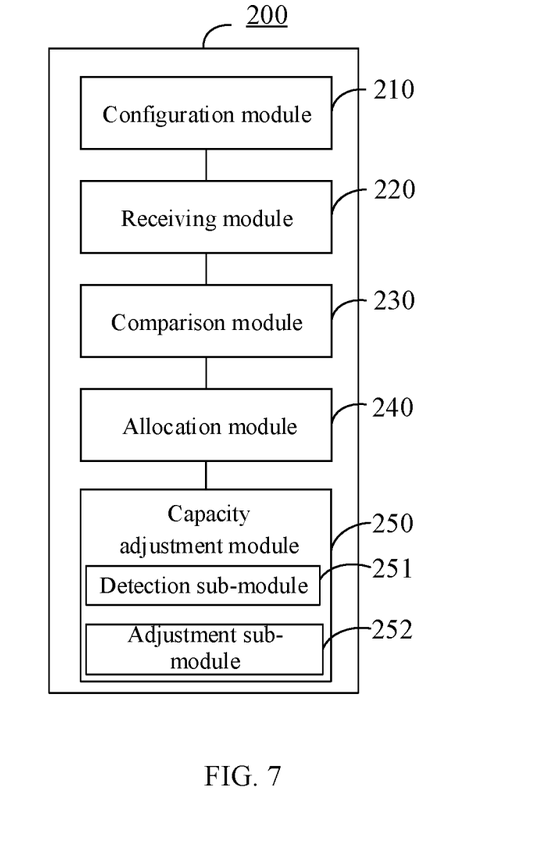
FIG. 7 is a second structure diagram of a device for memory allocation according to embodiments of the disclosure.

Referring to FIG. 7, FIG. 7 is a second structure diagram of a device 200 for memory allocation according to embodiments of the disclosure. The device 200 for memory allocation may further include a configuration module 210.

The configuration module 210 is configured to perform configuration on the memory of the electronic device 100 to configure the memory of the electronic device 100 into the first memory region and the second memory region.

In the embodiments of the disclosure, the configuration module 210 is configured to execute S110 in FIG. 3, and specific descriptions about the configuration module 210 may refer to the descriptions about S110 in FIG. 3.

Referring to FIG. 7 again, the device 200 for memory allocation may further include a capacity adjustment module 250. The capacity adjustment module 250 is configured to adjust a total capacity of the first memory region.

The capacity adjustment module 250 may include a detection sub-module 251 and an adjustment sub-module 252.

The detection sub-module 251 is configured to detect an available capacity of the first memory region.

The adjustment sub-module 252 is configured to adjust the total capacity of the first memory region within a preset adjustable capacity range according to a ratio of the available capacity of the first memory region to the total capacity of the first memory region.

The adjustment sub-module 252 is configured to adjust the total capacity of the first memory region within the preset adjustable capacity range according to the ratio of the available capacity of the first memory region to the total capacity of the first memory region, which includes the following operations.

When the ratio is less than a first preset value, the total capacity of the first memory region is increased.

When the ratio is greater than a second preset value, the total capacity of the first memory region is reduced, here, the second preset value is greater than the first preset value.

In the embodiments, the capacity adjustment module 250 is configured to execute S150 in FIG. 4, and specific descriptions about the capacity adjustment module 250 may refer to the descriptions about S150 in FIG. 4.

Embodiments of the disclosure also provide a readable storage medium, which includes a computer program that, when run, controls an electronic device 100 where the readable storage medium is located to perform the method for memory allocation, for example, the method for memory allocation illustrated in any one of FIG. 2 to FIG. 5.

From the above, the embodiments of the disclosure provide the method and device for memory allocation, the electronic device and the readable storage medium. The method is applied to the electronic device. The electronic device receives the request for memory allocation, here, the request for memory allocation includes the memory capacity to be allocated. The memory capacity to be allocated is compared with the capacity range of the preset memory block to obtain the comparison result. Therefore, the memory block with the memory capacity in the first memory region or the second memory region is allocated according to the comparison result, so as to separately manage memory blocks in different sizes and further reduce a probability of fragmentation presently caused by mixed use of the memory blocks in different sizes.

The above is only the embodiments of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

INDUSTRIAL APPLICABILITY

The embodiments of the disclosure provide a method and device for memory allocation, an electronic device and a readable storage medium. A memory of the electronic device includes a first memory region and a second memory region. The method includes that: a request for memory allocation is received, here, the request for memory allocation includes a memory capacity to be allocated; the memory capacity to be allocated is compared with a capacity range of a preset memory block to obtain a comparison result; and a memory block with the memory capacity is allocated from the first memory region or the second memory region according to the comparison result. According to the method, by allocating memory blocks in different memory regions, the memory blocks in different sizes are separately managed, so that memory fragmentation caused by mixed use of the memory blocks in different sizes is avoided, and the probability of occurrence of fragmentation is further reduced.

The invention claimed is:

1. A method for memory allocation, applied to an electronic device, wherein a memory of the electronic device comprises a first memory region and a second memory region, and the method comprises:
   receiving a request for memory allocation, wherein the request for memory allocation comprises a memory capacity to be allocated;
   comparing the memory capacity to be allocated and a capacity range of a preset memory block to obtain a comparison result;
   allocating a memory block with the memory capacity from at least one of the first memory region or the second memory region according to the comparison result; and
   adjusting a total capacity of the first memory region, which comprises:
   detecting an available capacity of the first memory region; and
   adjusting the total capacity of the first memory region within a preset adjustable capacity range according to a ratio of the available capacity of the first memory region to the total capacity of the first memory region.

2. The method of claim 1, wherein the allocating the memory block with the memory capacity from the at least one of the first memory region or the second memory region according to the comparison result comprises:
   when the memory capacity to be allocated is within the capacity range of the preset memory block and an available memory capacity of the first memory region is greater than the memory capacity to be allocated, allocating a preset memory block with the memory capacity from the first memory region;
   when the memory capacity to be allocated is within the capacity range of the preset memory block and the available memory capacity of the first memory region is less than the memory capacity to be allocated, allocating the preset memory block with the memory capacity from the second memory region;
   when the memory capacity to be allocated is not within the capacity range of the preset memory block, allocating the memory block with the memory capacity from the at least one of the first memory region or the second memory region.

3. The method of claim 2, wherein the allocating the memory block with the memory capacity from the at least one of the first memory region or the second memory region when the memory capacity to be allocated is not within the capacity range of the preset memory block comprises:
   when an available memory capacity of the second memory region is greater than the memory capacity to be allocated, allocating the memory block with the memory capacity from the second memory region;
   when the available memory capacity of the second memory region is less than the memory capacity to be allocated, performing memory compaction to obtain, from the at least one of the first memory region or the second memory region, the memory block with the memory capacity to be allocated.

4. The method of claim 2, wherein
   the memory capacity to be allocated is within the capacity range of the preset memory block, which represents that the memory block corresponding to the request for memory allocation is a memory block with a small capacity; and the memory capacity to be allocated is not within the capacity range of the preset memory block, which represents that the memory block corresponding to the request for memory allocation is a memory block with a large capacity.

5. The method of claim 1, further comprising:
performing configuration on the memory of the electronic device to configure the memory of the electronic device into the first memory region and the second memory region.

6. The method of claim 1, wherein the adjusting the total capacity of the first memory region within the preset adjustable capacity range according to the ratio of the available capacity of the first memory region to the total capacity of the first memory region comprises:
when the ratio is less than a first preset value, increasing the total capacity of the first memory region;
when the ratio is greater than a second preset value, reducing the total capacity of the first memory region, wherein the second preset value is greater than the first preset value.

7. An electronic device implementing the method according to claim 1, the electronic device comprising the memory and a processor coupled with the memory, wherein
the memory comprises the first memory region and the second memory region; and the processor is configured to allocate memory blocks in different memory regions to separately manage the memory blocks in different sizes, thereby reducing memory fragmentation caused by mixed use of the memory blocks in different sizes.

8. An electronic device, wherein a memory of the electronic device comprises a first memory region and a second memory region, and the electronic device comprises:
a processor; and
the memory storing one or more instructions for execution by the processor, the one or more instructions comprising:
instructions for receiving a request for memory allocation, wherein the request for memory allocation comprises a memory capacity to be allocated;
instructions for comparing the memory capacity to be allocated and a capacity range of a preset memory block to obtain a comparison result;
instructions for allocating a memory block with the memory capacity from at least one of the first memory region or the second memory region according to the comparison result; and
instructions for adjusting a total capacity of the first memory region, which comprise:
instructions for detecting an available capacity of the first memory region; and
instructions for adjusting the total capacity of the first memory region within a preset adjustable capacity range according to a ratio of the available capacity of the first memory region to the total capacity of the first memory region.

9. The electronic device of claim 8, wherein the instructions for allocating the memory block with the memory capacity from the at least one of the first memory region or the second memory region according to the comparison result comprises:
instructions for allocating a preset memory block with the memory capacity from the first memory region, when the memory capacity to be allocated is within the capacity range of the preset memory block and an available memory capacity of the first memory region is greater than the memory capacity to be allocated;
instructions for allocating the preset memory block with the memory capacity from the second memory region, when the memory capacity to be allocated is within the capacity range of the preset memory block and the available memory capacity of the first memory region is less than the memory capacity to be allocated;
instructions for allocating the memory block with the memory capacity from the at least one of the first memory region or the second memory region, when the memory capacity to be allocated is not within the capacity range of the preset memory block.

10. The electronic device of claim 9, wherein the instructions for allocating the memory block with the memory capacity from the at least one of the first memory region or the second memory region when the memory capacity to be allocated is not within the capacity range of the preset memory block comprises:
instructions for allocating the memory block with the memory capacity from the second memory region, when an available memory capacity of the second memory region is greater than the memory capacity to be allocated;
instructions for performing memory compaction to obtain, from the at least one of the first memory region or the second memory region, the memory block with the memory capacity to be allocated, when the available memory capacity of the second memory region is less than the memory capacity to be allocated.

11. The electronic device of claim 8, wherein the one or more instructions further comprise:
performing configuration on the memory of the electronic device to configure the memory of the electronic device into the first memory region and the second memory region.

12. The electronic device of claim 8, wherein the instructions for adjusting the total capacity of the first memory region within the preset adjustable capacity range according to the ratio of the available capacity of the first memory region to the total capacity of the first memory region comprises:
instructions for increasing the total capacity of the first memory region when the ratio is less than a first preset value;
instructions for reducing the total capacity of the first memory region when the ratio is greater than a second preset value, wherein the second preset value is greater than the first preset value.

13. A non-transitory readable storage medium, comprising a computer program that, when executed, causes a processor of an electronic device where the readable storage medium is located to perform a method for memory allocation, a memory of the electronic device comprising a first memory region and a second memory region, and the method comprising:
receiving a request for memory allocation, wherein the request for memory allocation comprises a memory capacity to be allocated;
comparing the memory capacity to be allocated and a capacity range of a preset memory block to obtain a comparison result;
allocating a memory block with the memory capacity from at least one of the first memory region or the second memory region according to the comparison result; and
adjusting a total capacity of the first memory region, which comprises:

detecting an available capacity of the first memory region; and adjusting the total capacity of the first memory region within a preset adjustable capacity range according to a ratio of the available capacity of the first memory region to the total capacity of the first memory region.

14. The non-transitory readable storage medium of claim 13, wherein the allocating the memory block with the memory capacity from the at least one of the first memory region or the second memory region according to the comparison result comprises:

when the memory capacity to be allocated is within the capacity range of the preset memory block and an available memory capacity of the first memory region is greater than the memory capacity to be allocated, allocating a preset memory block with the memory capacity from the first memory region;

when the memory capacity to be allocated is within the capacity range of the preset memory block and the available memory capacity of the first memory region is less than the memory capacity to be allocated, allocating the preset memory block with the memory capacity from the second memory region;

when the memory capacity to be allocated is not within the capacity range of the preset memory block, allocating the memory block with the memory capacity from the at least one of the first memory region or the second memory region.

15. The non-transitory readable storage medium of claim 14, wherein the allocating the memory block with the memory capacity from the at least one of the first memory region or the second memory region when the memory capacity to be allocated is not within the capacity range of the preset memory block comprises:

when an available memory capacity of the second memory region is greater than the memory capacity to be allocated, allocating the memory block with the memory capacity from the second memory region;

when the available memory capacity of the second memory region is less than the memory capacity to be allocated, performing memory compaction to obtain, from the at least one of the first memory region or the second memory region, the memory block with the memory capacity to be allocated.

16. The non-transitory readable storage medium of claim 13, wherein the method further comprises:

performing configuration on the memory of the electronic device to configure the memory of the electronic device into the first memory region and the second memory region.

17. The non-transitory readable storage medium of claim 13, wherein the adjusting the total capacity of the first memory region within the preset adjustable capacity range according to the ratio of the available capacity of the first memory region to the total capacity of the first memory region comprises:

when the ratio is less than a first preset value, increasing the total capacity of the first memory region;

when the ratio is greater than a second preset value, reducing the total capacity of the first memory region, wherein the second preset value is greater than the first preset value.

* * * * *